US012651408B1

(12) United States Patent
Chen

(10) Patent No.: US 12,651,408 B1
(45) Date of Patent: Jun. 9, 2026

(54) INTELLIGENT PROCESSING SYSTEM FOR BUILDING THREE-DIMENSIONAL POINT CLOUD DATA AND AUTOMATIC GENERATION OF BIM MODELS AND METHOD

(71) Applicant: Dexuan Chen, Los Angeles, CA (US)

(72) Inventor: Dexuan Chen, Los Angeles, CA (US)

( * ) Notice: Subject to any disclaimer, the term of this patent is extended or adjusted under 35 U.S.C. 154(b) by 0 days.

(21) Appl. No.: 19/369,441

(22) Filed: Oct. 27, 2025

(51) Int. Cl.
| | |
|---|---|
| *G06T 17/00* | (2006.01) |
| *G06T 7/60* | (2017.01) |
| *G06T 19/20* | (2011.01) |
| *G06V 10/26* | (2022.01) |
| *G06V 10/30* | (2022.01) |
| *G06V 10/44* | (2022.01) |
| *G06V 10/52* | (2022.01) |
| *G06V 10/74* | (2022.01) |
| *G06V 10/82* | (2022.01) |
| *G06V 20/64* | (2022.01) |

(52) U.S. Cl.
CPC ................ *G06T 17/00* (2013.01); *G06T 7/60* (2013.01); *G06T 19/20* (2013.01); *G06V 10/26* (2022.01); *G06V 10/30* (2022.01); *G06V 10/457* (2022.01); *G06V 10/52* (2022.01); *G06V 10/74* (2022.01); *G06V 10/761* (2022.01); *G06V 10/82* (2022.01); *G06V 20/64* (2022.01); *G06T 2207/20084* (2013.01); *G06T 2210/56* (2013.01)

(58) Field of Classification Search
CPC ........... G06T 17/00; G06T 7/60; G06T 19/20; G06V 10/764
USPC ........................................................ 345/419
See application file for complete search history.

(56) References Cited

U.S. PATENT DOCUMENTS

2020/0111251 A1* 4/2020 Shi ........................ G06V 10/764
2020/0360181 A1* 11/2020 Xiao ....................... G06F 3/011

* cited by examiner

*Primary Examiner* — Thomas J Lett
(74) *Attorney, Agent, or Firm* — Nicholas Makridakis

(57) ABSTRACT

The present invention relates to the field of Building Information Modeling (BIM) technology, specifically to an intelligent processing and automatic generation system and method for building 3D point cloud data and BIM models. By constructing multi-scale component feature representations using continuous synchronization theory, utilizing a topology-aware graph network for relational reasoning, and employing homotopy group theory to achieve topological preservation in component completion, the system significantly improves the accuracy and completeness of BIM model generation.

10 Claims, 6 Drawing Sheets

INTELLIGENT PROCESSING SYSTEM FOR BUILDING THREE-DIMENSIONAL POINT CLOUD DATA AND AUTOMATIC GENERATION OF BIM MODELS AND METHOD

TECHNICAL FIELD

The present invention relates to the field of building information modeling (BIM) technology, and in particular to an intelligent processing system for building three-dimensional point cloud data and an automatic BIM model generation method, which is applicable to scenarios such as building renovation, historic building preservation, and facility management for automatic generation of building information models.

BACKGROUND ART

Building Information Modeling (BIM) technology is currently an important development trend in the field of architectural engineering, capable of effectively improving the efficiency and quality of building design, construction, and management. The construction of traditional BIM models mainly relies on manual modeling, which involves large workloads, low efficiency, and high costs, making it difficult to meet the demands of large-scale building informatization.

With the development of three-dimensional laser scanning technology, it has become possible to acquire three-dimensional building information through point cloud data and automatically generate BIM models. However, the conversion from point cloud data to BIM models still faces numerous technical challenges: on one hand, building point cloud data are massive and noisy, making it difficult to directly construct high-quality BIM models; on the other hand, the topological relationships among building components are complex, and existing technologies are unable to accurately identify and infer these relationships, especially in cases of occlusion and missing components.

Existing technologies primarily rely on geometric features for point cloud processing and component recognition, which require high-quality point cloud data and perform poorly in complex occlusion scenarios. Traditional methods often treat components as independent entities and lack an in-depth understanding of the intrinsic topological relationships among components, resulting in BIM models with deficiencies in completeness and accuracy.

Therefore, how to efficiently and accurately convert building three-dimensional point cloud data into complete BIM models, particularly how to handle complex component relationships and occlusion issues, has become a technical problem urgently to be solved.

SUMMARY OF THE INVENTION

The purpose of the present invention is to provide an intelligent processing system for building three-dimensional point cloud data and an automatic BIM model generation method, aimed at solving the problems in existing technologies, such as inaccurate component recognition, incomplete relationship inference, and limited occlusion handling capabilities during the conversion from point cloud data to BIM models.

The present invention proposes an intelligent processing system for building three-dimensional point cloud data and automatic BIM model generation, comprising:

a point cloud data acquisition module, configured to collect three-dimensional laser scanning point cloud data of buildings;

a semantic segmentation module, connected to the point cloud data acquisition module, configured to receive the three-dimensional laser scanning point cloud data collected by the point cloud data acquisition module, and to identify building components through deep learning, spatial information, and geometric constraints;

a component parameter fitting module, connected to the semantic segmentation module, configured to receive the building components identified by the semantic segmentation module and to obtain component parameters through clustering, fitting, and statistical analysis;

a parametric component model library, configured to store parametric BIM component models that comply with engineering design standards;

a component model generation module, connected to the component parameter fitting module and the parametric component model library, configured to automatically select matching component models from the parametric component model library based on the component parameters obtained by the component parameter fitting module, and to automatically assemble them to generate a preliminary BIM model;

an occlusion processing module, connected to the component model generation module, configured to receive the preliminary BIM model generated by the component model generation module, and to automatically repair building components that are occluded in the preliminary BIM model;

a component relationship inference module, connected to the occlusion processing module, configured to receive the BIM model repaired by the occlusion processing module, the component relationship inference module comprising a multi-scale topological feature extraction unit, a topology-persistence-driven relationship inference unit, and a homology group-based occlusion completion unit, wherein the multi-scale topological feature extraction unit is configured to construct multi-scale topological feature representations of building components using persistent homology theory, the topology-persistence-driven relationship inference unit is configured to perform component relationship inference by constructing a topology-aware graph structure based on topological features, and the homology group-based occlusion completion unit is configured to achieve topology-preserving completion of occluded components using homology group theory, thereby inferring the topological and logical relationships among building components, automatically completing missing components, and generating a high-precision BIM model;

a BIM model construction module, connected to the component relationship inference module, configured to receive the high-precision BIM model generated by the component relationship inference module and to perform model integration;

a BIM model inspection module, connected to the BIM model construction module, configured to perform geometric, topological, and logical checks on the BIM model integrated by the BIM model construction module.

Preferably, the semantic segmentation module comprises:

a data processing unit, configured to perform filtering, denoising, and sampling operations on the point cloud data;

a building feature recognition unit, configured to automatically identify building components using a deep neural network model;

a semantic reconstruction unit, configured to restore the shapes of components that are locally occluded or damaged;

a data output unit, configured to transmit the recognized semantic data to the component parameter fitting module.

Preferably, the component parameter fitting module comprises:

a data processing unit, configured to convert the received point cloud data into numerical sequences and segment them based on clustering density;

a clustering unit, configured to divide the point cloud data into subsets corresponding to each building component;

a fitting unit, configured to fit the point cloud data within each subset to obtain the component boundary lines;

a statistical analysis unit, configured to calculate component parameters such as width, height, material, and texture from the obtained component boundary lines.

Preferably, the component model generation module comprises:

a component parameter receiving unit, configured to receive the component parameters obtained by the component parameter fitting module;

a component matching unit, configured to match corresponding models from the parametric component model library;

an automatic model construction unit, configured to generate a preliminary BIM model based on the models matched by the component matching unit.

Preferably, the parametric component model library comprises:

a component model unit, configured to create parametric definitions for each component model;

a matching model library unit, configured to extract models from the component model unit and construct a mapping between the models and their corresponding component parameters.

Preferably, the multi-scale topological feature extraction unit comprises:

a preprocessing subunit, configured to receive the component point cloud data after semantic segmentation and perform coordinate normalization;

a complex construction subunit, configured to construct a nested Vietoris-Rips complex sequence;

a homology computation subunit, configured to compute homology groups of different dimensions;

a persistence pair extraction subunit, configured to record the birth and death values of topological features to form persistence pairs;

a feature descriptor generation subunit, configured to generate topological feature descriptors of the components.

Preferably, the topology-persistence-driven relationship inference unit comprises:

a topology-aware graph construction subunit, configured to represent components as nodes in a graph and establish connections based on spatial proximity and topological similarity;

a topology attention computation subunit, configured to calculate topological similarity and attention weights among components;

a message passing subunit, configured to perform multi-level message passing, from local connectivity to global topological structure analysis;

a relationship prediction subunit, configured to predict the types and confidence levels of relationships among components;

a topology consistency verification subunit, configured to apply topological rules to verify and correct the predicted relationships.

Preferably, the homology group-based occlusion completion unit comprises:

an occlusion region identification subunit, configured to identify occluded regions in the point cloud and analyze their boundary topological features;

a homotopy equivalence modeling subunit, configured to establish a topological space mapping before and after occlusion;

a morphology prediction subunit, configured to match similar prototypes from the component prototype library based on boundary topological features and perform topology-preserving deformation;

a multiple hypothesis generation subunit, configured to generate multiple completion hypotheses;

an evaluation and selection subunit, configured to select the hypothesis with the highest topological score as the final completion result.

Preferably, the BIM model inspection module comprises:

a geometric inspection subunit, configured to check the continuity of building component boundary lines, sharp corners, concave and convex surfaces, and intersections;

a topological inspection subunit, configured to detect overlapping components, as well as component ownership and connectivity;

a logical inspection subunit, configured to verify the consistency of component dimensions and the smooth consistency of materials.

A method for intelligent processing of building three-dimensional point cloud data and automatic generation of BIM models, comprising the following steps:

acquiring full-scale point cloud data of a building using a three-dimensional laser scanning device;

processing the acquired point cloud data by filtering, denoising, and sampling, automatically identifying building components using a deep neural network model, and restoring locally occluded or damaged component shapes;

performing clustering, fitting, and statistical analysis on the identified building components to fit component boundary lines from the point cloud data and calculate component parameters, including width, height, material, and texture;

automatically selecting matching component models from the parametric component model library based on the obtained component parameters and automatically assembling them to generate a preliminary BIM model;

automatically repairing occluded building components in the preliminary BIM model;

processing the repaired BIM model through the component relationship inference module, comprising:

constructing multi-scale topological feature representations of building components using persistent homology theory, by constructing nested complex sequences, computing homology groups, extracting persistence pairs, and generating feature descriptors, thereby representing the topological features of the components;

constructing a topology-aware graph structure based on topological features and performing component relationship inference using a topology attention mechanism and multi-level message passing;

implementing topology-preserving completion of occluded components using homology group theory, by identifying occluded areas, establishing homotopy equivalence relationships, predicting component morphology, and evaluating multiple completion hypotheses to select the optimal completion result;

inferring the topological and logical relationships among building components, automatically completing missing components, and generating a high-precision BIM model;

performing geometric, topological, and logical checks on the generated BIM model, including checking the continuity of building component boundary lines, detecting component overlaps, verifying component ownership and connectivity, and ensuring the consistency of component dimensions.

The invention introduces topological theory to innovate the component relationship inference module, constructs multi-scale component feature representations using persistent homology theory, performs component relationship inference driven by topological persistence, and achieves accurate completion of occluded components based on homology group theory, thereby significantly improving the accuracy and completeness of BIM model generation.

The invention has the following advantageous effects:

1. Improved robustness of component recognition: By using topological invariants as feature representations, the system exhibits stronger resistance to variations in point cloud quality, density, and partial occlusions. Even when noise levels exceed 30%, high recognition accuracy can still be maintained.

2. Enhanced accuracy of relationship inference: The topology-aware graph-based relationship inference mechanism can capture the intrinsic topological correlations among components. The accuracy of component relationship recognition is increased by approximately 25%, with the recognition accuracy for irregular components improved by about 35%.

3. Improved occlusion handling capability: The homology group-based occlusion completion technique can accurately restore occluded components while maintaining topological consistency. In severe occlusion scenarios (occlusion rate >40%), the completeness of component restoration is improved by approximately 45%.

4. Increased processing efficiency: The system achieves highly automated processing from point cloud data to BIM models, reducing the traditional manual modeling cycle from several weeks to a few hours and significantly lowering labor costs.

5. Strong adaptability: The system can accommodate various architectural styles and structural characteristics without the need for retraining parameter adjustment for different building types, demonstrating broad application prospects.

DETAILED DESCRIPTION OF THE EMBODIMENTS

With reference to FIGS. 1-11, the present invention will be further described in detail in conjunction with the accompanying drawings and specific embodiments. It should be understood by those skilled in the art that these embodiments are provided for illustrative purposes only and are not intended to limit the scope of the invention.

Figure 1:
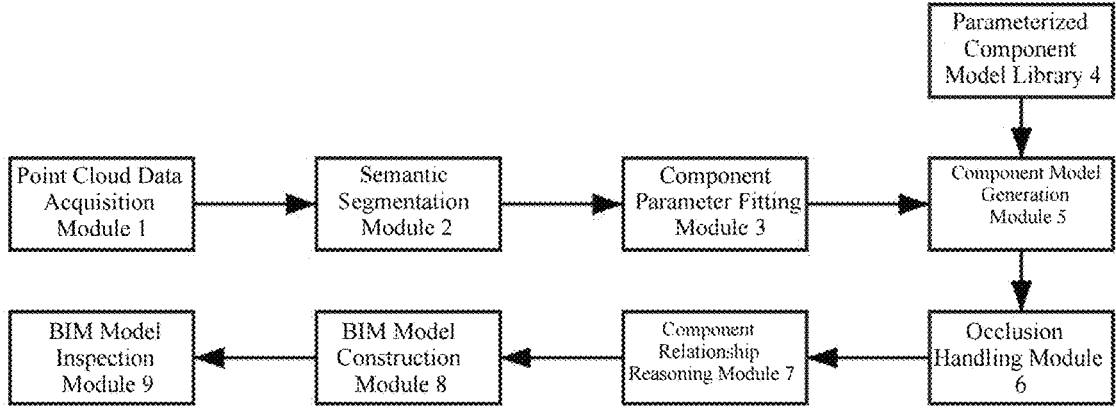
FIG. 1 is an overall architecture diagram of the intelligent processing system for building three-dimensional point cloud data and automatic generation of BIM models according to the invention.

Referring to FIG. 1, the intelligent processing system for building three-dimensional point cloud data and automatic generation of BIM models provided by the invention comprises a point cloud data acquisition module 1, a semantic segmentation module 2, a component parameter fitting module 3, a parametric component model library 4, a component model generation module 5, an occlusion processing module 6, a component relationship inference module 7, a BIM model construction module 8, and a BIM model checking module 9.

The point cloud data acquisition module 1 collects three-dimensional laser scanning point cloud data of buildings and transmits the data to the semantic segmentation module 2. The semantic segmentation module 2 accurately identifies building components using deep learning, spatial information, and geometric constraints. The semantic segmentation module 2 then transmits the point cloud data to the component parameter fitting module 3. The component parameter fitting module 3 obtains component parameters through clustering, fitting, and statistical analysis, and transmits the parameters to the component model generation module 5. The parametric component model library 4 is a repository of BIM component models that have been parameterized in accordance with engineering design standards, providing component models for the component model generation module 5. The component model generation module 5 automatically selects matching component models from the parametric component model library 4 based on the component parameters obtained from semantic segmentation and parameter fitting, and automatically assembles them to generate a preliminary BIM model. The occlusion processing module 6 can automatically restore building components in the preliminary BIM model that are occluded, and forwards the restored BIM model to the component relationship inference module 7. The component relationship inference module 7, using an innovative topological approach, infers the topological and logical relationships among building components, automatically completes missing components, and generates a high-precision BIM model. The BIM model construction module 8 receives the output from the component relationship inference module 7 and performs model integration. The BIM model checking module 9 conducts geometric, topological, and logical checks on the BIM model to ensure that the final BIM model complies with the relevant standards.

Figure 2:
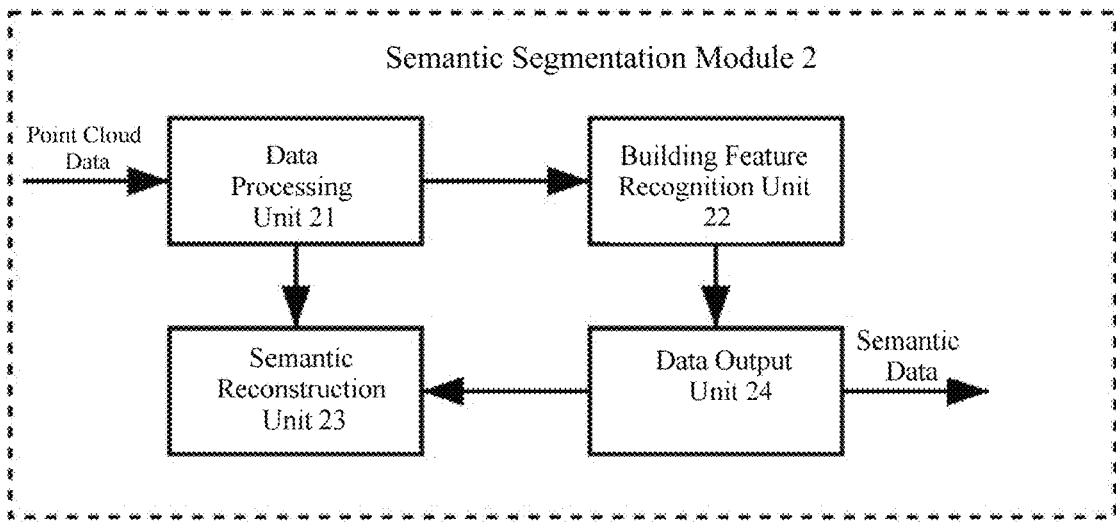
FIG. 2 is a schematic diagram of the semantic segmentation module according to the invention.

Referring to FIG. 2, the semantic segmentation module 2 comprises a data processing unit 21, a building feature recognition unit 22, a semantic reconstruction unit 23, and a data output unit 24.

The data processing unit 21 performs filtering, denoising, and sampling operations on the point cloud data. Specifically, voxel filtering may be used for downsampling the point cloud, with a sampling resolution typically set to 5-10 mm to balance point cloud accuracy and computational efficiency; statistical filtering is employed to remove noise points, with the noise threshold usually set at twice the standard deviation; bilateral filtering is applied for smoothing while preserving edge features.

The building feature recognition unit 22 automatically identifies building components using a deep neural network model. Preferably, an improved PointNet network is employed for point cloud semantic segmentation, which consists of three main components: the Multi-layer PointNet for learning point cloud geometric features; the Transformation to Object Space (TOS) for point cloud registration; and the Multi-class Probability Prediction Layer (MPL) for generating semantic labels. Network training uses an adaptive learning rate optimization algorithm, with an initial learning rate set to 0.001, decaying to 50% of its value every 50 epochs, and a minimum learning rate of 0.00001 to enhance convergence efficiency.

The semantic reconstruction unit 23 restores the shapes of building components that are locally occluded or damaged. The data output unit 24 transmits the recognized semantic data to the component parameter fitting module 3.

Figure 3:
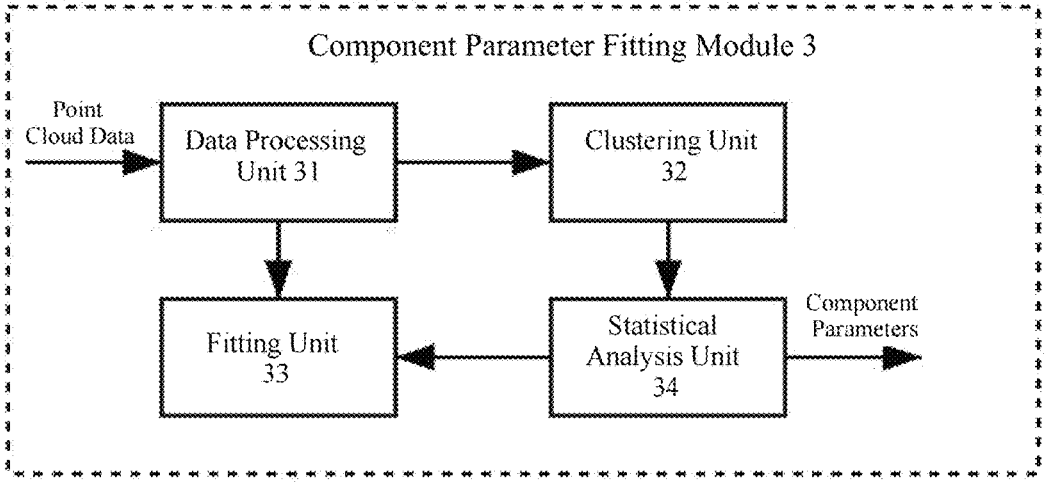
FIG. 3 is a schematic diagram of the component parameter fitting module according to the invention.

Referring to FIG. 3, the component parameter fitting module 3 includes a data processing unit 31, a clustering unit 32, a fitting unit 33, and a statistical analysis unit 34.

The data processing unit 31 converts the received point cloud data into numerical sequences and segments them according to clustering density. The clustering unit 32 partitions the point cloud data into subsets corresponding to individual building components, typically using a density-based clustering algorithm such as DBSCAN, where the neighborhood radius ε is set to five times the average point cloud distance, and the minimum number of points MinPts is set to 30 to accommodate varying point cloud densities.

The fitting unit 33 fits the point cloud data within each subset to generate the component boundary lines. For planar components (such as walls and floors), the RANSAC plane fitting algorithm is used, with an inlier threshold set to 3 mm and a maximum of 1000 iterations. For curved components (such as columns and pipes), the RANSAC cylinder fitting algorithm is applied, with an inlier threshold of 5 mm and a maximum of 2000 iterations.

The statistical analysis unit 34 calculates parameters such as width, height, material, and texture for each component boundary line. For material identification, classification is performed based on the point cloud's reflectivity values; for example, concrete typically has a reflectivity in the range of 0.3-0.5, while glass usually falls in the range of 0.7-0.9.

Figure 4:
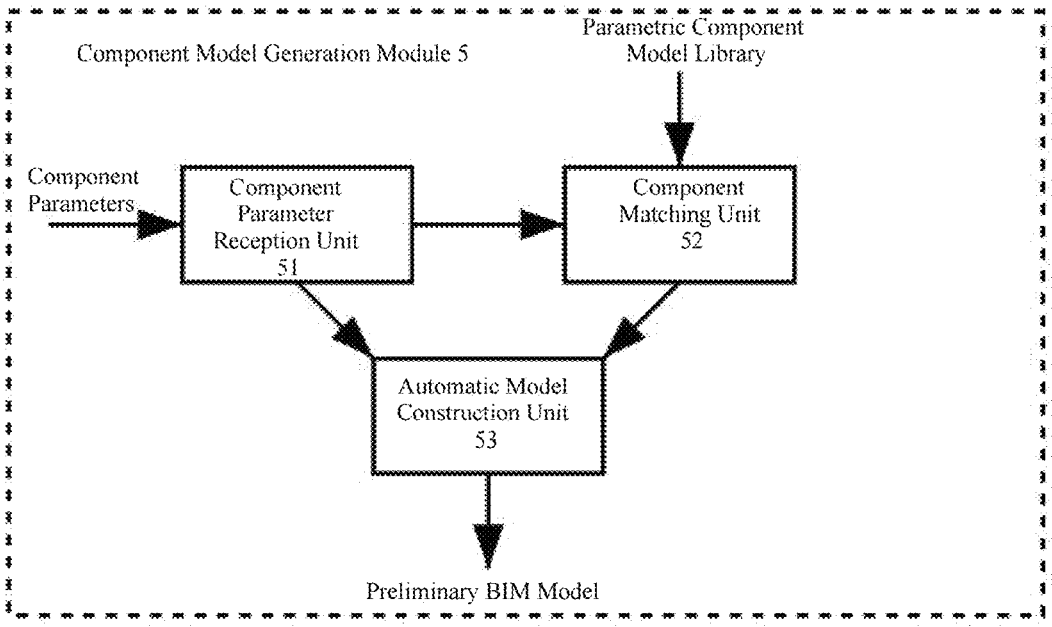
FIG. 4 is a schematic diagram of the component model generation module according to the invention.

Referring to FIG. 4, the component model generation module 5 includes a component parameter receiving unit 51, a component matching unit 52, and an automatic model construction unit 53.

The component parameter receiving unit 51 receives the component parameters obtained by the component parameter fitting module 3. The component matching unit 52 matches the corresponding models from the parametric component model library 4, using parameter similarity calculation. A similarity threshold of 0.85 is set, meaning a match is considered successful when the parameter similarity exceeds 0.85. The automatic model construction unit 53 generates a preliminary BIM model based on the matched models, taking into account the spatial relationships between components and maintaining the spacing between adjacent components within 5 mm.

Figure 5:
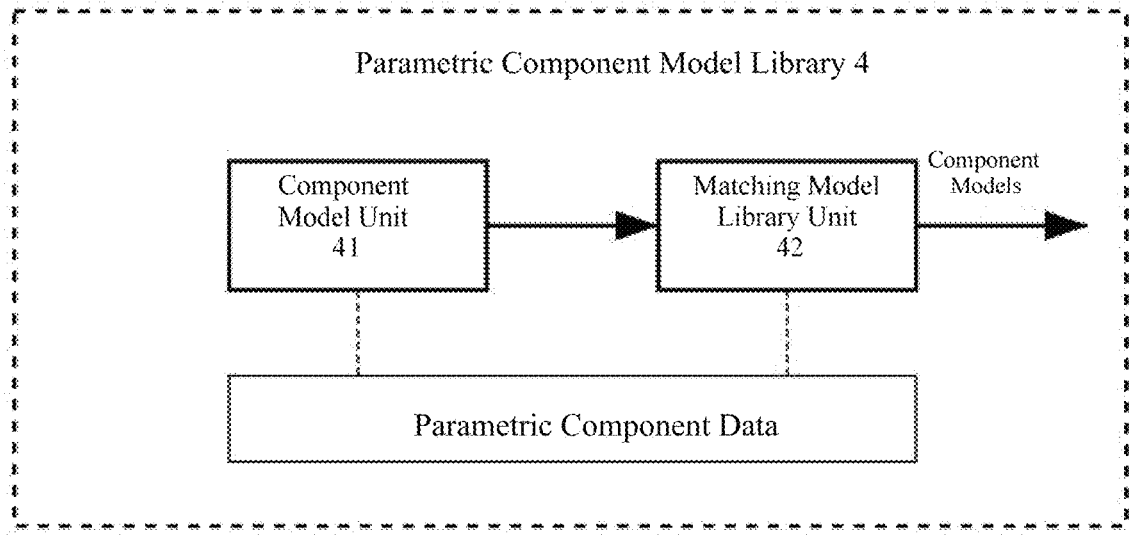
FIG. 5 is a schematic diagram of the parametric component model library according to the invention.

Referring to FIG. 5, the parametric component model library 4 includes a component model unit 41 and a matching model library unit 42.

The component model unit 41 creates parametric definitions for each component model, including geometric parameters (such as length, width, and height) and non-geometric parameters (such as material and functional classification). The matching model library unit 42 extracts models from the component model unit 41 and constructs a mapping between the models and their corresponding component parameters. This mapping is implemented using a KD-tree structure for fast retrieval, with a query time complexity of $0(\log n)$, significantly improving matching efficiency.

Figure 6:
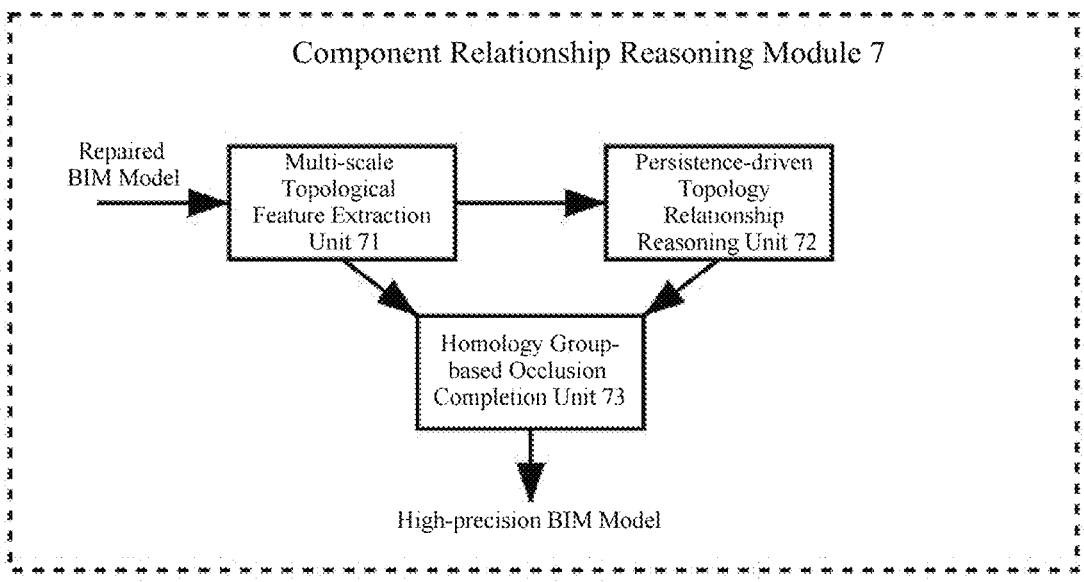
FIG. 6 is a schematic diagram of the component relationship inference module according to the invention.

Referring to FIG. 6, the component relationship inference module 7 is the core innovative part of the present invention, comprising a multi-scale topological feature extraction unit 71, a topological persistence-driven relationship inference unit 72, and a homology group-based occlusion completion unit 73.

Figure 7:
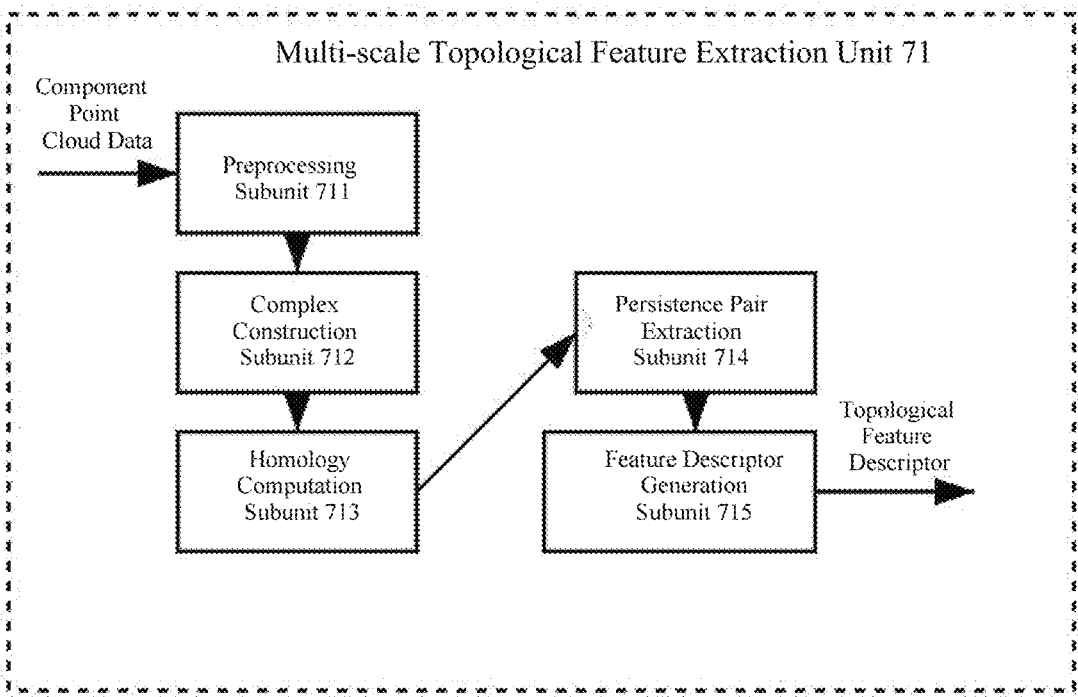
FIG. 7 is a flowchart of the multi-scale topological feature extraction unit according to the invention.

Referring to FIG. 7, the multi-scale topological feature extraction unit 71 includes a preprocessing subunit 711, a complex construction subunit 712, a homology computation subunit 713, a persistence pair extraction subunit 714, and a feature descriptor generation subunit 715.

The preprocessing subunit 711 receives the component point cloud data after semantic segmentation and performs coordinate normalization, scaling the point cloud into a $[-1, 1]^3$ cube. The complex construction subunit 712 constructs a nested Vietoris-Rips complex sequence. The homology computation subunit 713 calculates homology groups of different dimensions. The persistence pair extraction subunit 714 records the birth and death values of topological features to form persistence pairs. The feature descriptor generation subunit 715 generates topological feature descriptors for the components.

This subunit is based on Persistent Homology, which is a core tool of topological data analysis and can capture the topological features of data at different scales. The specific implementation process is as follows:

First, for each building component point cloud P, define a multi-scale distance threshold sequence $T = \{t_0, t_1, \ldots, t_n\}$, where $t_0 = 0$ and $t_b$ is the maximum analysis scale. Preferably, set n=20, and let the thresholds increase on a logarithmic scale to account for fine structures at small scales.

Then, for each threshold $t_i$, construct the Vietoris-Rips complex $VR(t_i)$, forming a nested complex sequence $VR(t_0) \subseteq VR(t_i) \subseteq \ldots \subseteq VR(t_n)$. In implementation, an octree-based spatial partitioning is used to accelerate nearest neighbor searches, reducing the computational complexity from $0(N^2)$ to $0(N \log N)$.

Next, compute the 0-, 1-, and 2-dimensional homology groups $H_0(VR(t_i))$, $H_1(VR(t_i))$, and $H_2(VR(t_i))$, representing connected components, loop structures, and cavity features, respectively. The homology groups are calculated using an incremental algorithm with a complexity of $O(n^3)$, where n is the number of simplices in the complex.

For the computed homology groups, record the birth value b and death value d of each topological feature to form persistence pairs (b, d), and classify them by dimension k to store as persistence pair sets $PD_0$, $PD_1$, $PD_2$. To filter out noisy features, set a persistence threshold $\tau$:

$$\tau = \max(0.05 \times t_n, 3 \times \sigma),$$

Where: $\tau$ is the persistence threshold, representing the minimum persistence value of topological features to be retained; $t_n$ is the maximum analysis scale, the largest value in the threshold sequence T; $\sigma$ is the standard deviation of persistence values. Only features with persistence (d–b) greater than $\tau$ are retained.

Finally, a multi-resolution histogram is constructed by dividing the persistence space into an 8×8 grid, counting the number of persistence pairs falling into each grid cell, and applying a logarithmic transformation to enhance stability, thereby generating the feature descriptor TF:

$$TF = \{\log(1 + H_{ijk})\},$$

Where: TF is the topological feature descriptor of the component, represented as a 192-dimensional vector; $H_{ijk}$ is the number of persistence pairs in the grid cell at row i, column j, and dimension k (k=0, 1, 2); log denotes the natural logarithm function, used to enhance numerical stability.

This representation overcomes the limitations of traditional geometric features, accurately capturing the intrinsic topological structure of building components and exhibiting stronger robustness to variations in point cloud quality and sampling density.

Figure 8:
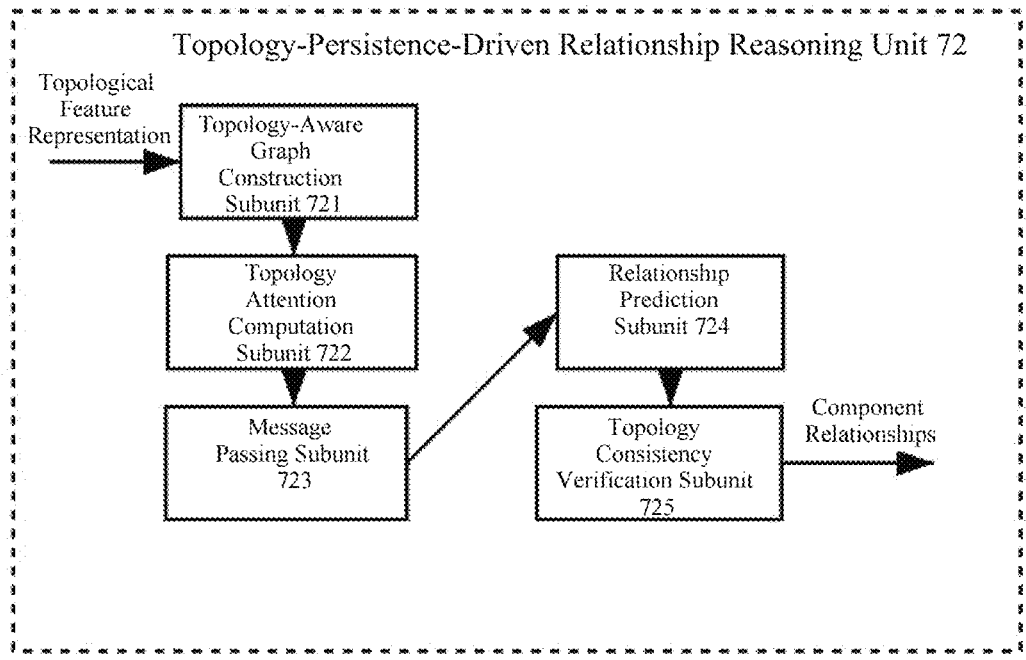
FIG. 8 is a flowchart of the topology-persistence-driven relationship inference unit according to the invention.

Referring to FIG. 8, the topology-persistence-driven relationship inference unit 72 includes a topology-aware graph construction subunit 721, a topology attention computation subunit 722, a message passing subunit 723, a relationship prediction subunit 724, and a topology consistency verification subunit 725.

The topology-aware graph construction subunit 721 treats components as nodes in a graph and establishes connections based on spatial proximity and topological similarity. The topology attention computation subunit 722 calculates the topological similarity and attention weights between components. The message passing subunit 723 performs multi-level message passing, analyzing from local connectivity to global topological structures. The relationship prediction subunit 724 predicts the types of relationships between components and their confidence levels. The topology consistency verification subunit 725 applies topological rules to verify and correct the predicted relationships.

This subunit combines topological feature representations with graph neural networks, designing a persistence-driven framework for relationship inference. The specific implementation process is as follows:

First, construct a topology-aware graph G=(V,E), where the node set V represents all building components and the node features are the topological feature descriptors TF. The edge set E is established based on two rules: the spatial proximity rule (connecting components whose distance is less than a threshold $d_s$) and the topological similarity rule (connecting components whose topological feature similarity exceeds a threshold $s_t$). Preferably, the spatial threshold $d_s$ is set to twice the average component size, and the topological similarity threshold $s_t$ is set to 0.7.

For edge feature computation, both spatial position features (relative distance and relative direction vectors) and topological similarity features (persistence diagram matching score and inner product of feature vectors) are considered, forming the edge feature matrix M.

Then, a topology-guided attention mechanism is designed, calculated as follows:

For nodes i and j, the topological feature similarity s(i, j) is computed using cosine similarity:

$$s(i, j) = \frac{TF_i \cdot TF_j}{\|TF_i\| \cdot \|TF_j\|},$$

Where: s(i, j) is the topological feature similarity between nodes i and j, with a value range of [−1, 1]; $TF_i$ and $TF_j$ represent the topological feature descriptors of components i and j, respectively, each being a 192-dimensional vector; "." denotes the vector dot product; $\|TF_i\|$ denotes the $L^2$ norm (Euclidean norm) of vector $TF_i$, calculated as the square root of the sum of squares of its elements.

The spatial distance decay factor d(i, j) is defined as:

$$d(i, j) = \exp\left(-\frac{\|p_i - p_j\|^2}{2\sigma^2}\right),$$

Where: d(i, j) is the spatial distance decay factor between nodes i and j, with a range of (0, 1]; $p_i$ and $p_j$ represent the spatial center coordinates of components i and j, respectively, as three-dimensional vectors; $\|p_i - p_j\|$ denotes the Euclidean distance between the two points; $\sigma$ is the decay parameter that controls the range of distance influence, preferably set to 1.5 times the average component size; exp denotes the natural exponential function.

The attention weight is then obtained as:

$$a(i, j) = \frac{\exp(s(i, j) \times d(i, j))}{\sum_{k \in N(i)} \exp(s(i, k) \times d(i, k))},$$

Where: a (i, j) is the attention weight of node i with respect to node j, representing the importance of j to i in information propagation, with a range of (0, 1); exp denotes the natural exponential function; N(i) represents the set of all neighbor nodes of node i; the denominator serves as a normalization factor to ensure that the sum of all attention weights equals 1.

Using a multi-head attention design, K=8 independent attention heads are set, each focusing on a different subspace of the topological features, and the results of all heads are combined to obtain an enhanced node representation:

$$h_i' = Concat(\text{head}_1, \text{head}_2, \ldots, \text{head}_k)W^0,$$

Where: $h_i'$ is the enhanced feature representation of node i; $head_k$ denotes the output of the K attention heads; Concat represents the vector concatenation operation; and $W^0$ is the output transformation matrix used to map the concatenated vector to the appropriate dimension.

Next, a three-layer message passing network is designed, focusing respectively on local connectivity, regional structure, and global topology. The message passing logic for each layer is as follows:

$$h_i^{(1+1)} = \sigma\left(W^{(1)} \cdot h_i^{(1)} + \sum_{j \in N(i)} a_{ij} \cdot U^{(1)} \cdot h_j^{(1)}\right),$$

Where:

$$h_i^{(1)}$$

denotes the feature representation of node i at layer I;

$$h_i^{(1+1)}$$

denotes the feature representation of node i at layer I+1; $W^{(1)}$ and $U^{(1)}$ are the learnable weight matrices at layer 1; $\sigma$ is a nonlinear activation function, using LeakyReLU, defined as $\sigma(x) = max(0.01x, x)$; N(i) denotes the set of neighbors of node i; $\alpha_{ij}$ is the attention weight of node i to node j; the summation term represents the aggregation of information from all neighboring nodes.

Finally, for each pair of components(i, j), predict their relationship type:

$$r_{ij} = MLP\left(\left[h_i^{(L)}, h_j^{(L)}, e_{ij}\right]\right),$$

Where: $r_{ij}$ is the predicted relationship type vector between components i and j, with dimension |R|, representing the probability distribution over all relationship types;

$$h_i^{(L)}$$

and $$h_j^{(L)}$$

are the node feature representations at the final layer L; $e_{ij}$ is the edge feature; [•,•,•] denotes vector concatenation; MLP is a multilayer perceptron with structure [512, 256, 128, |R|] where |R| is the number of relationship types, R={support, connection, containment, parallel, orthogonal, intersection, adjacency}.

To ensure the consistency of the prediction results, topological rules are applied for verification, including: symmetry check (if i supports j, then j cannot support i); transitivity check (if i connects to j and j connects to k, then i and k may be related); and hierarchy check (support relationships among building components should form a directed acyclic graph).

This relational reasoning framework organically integrates topological theory with graph neural networks, enabling the understanding of intrinsic relationships among components from a topological perspective and achieving more accurate relational reasoning.

Figure 9:
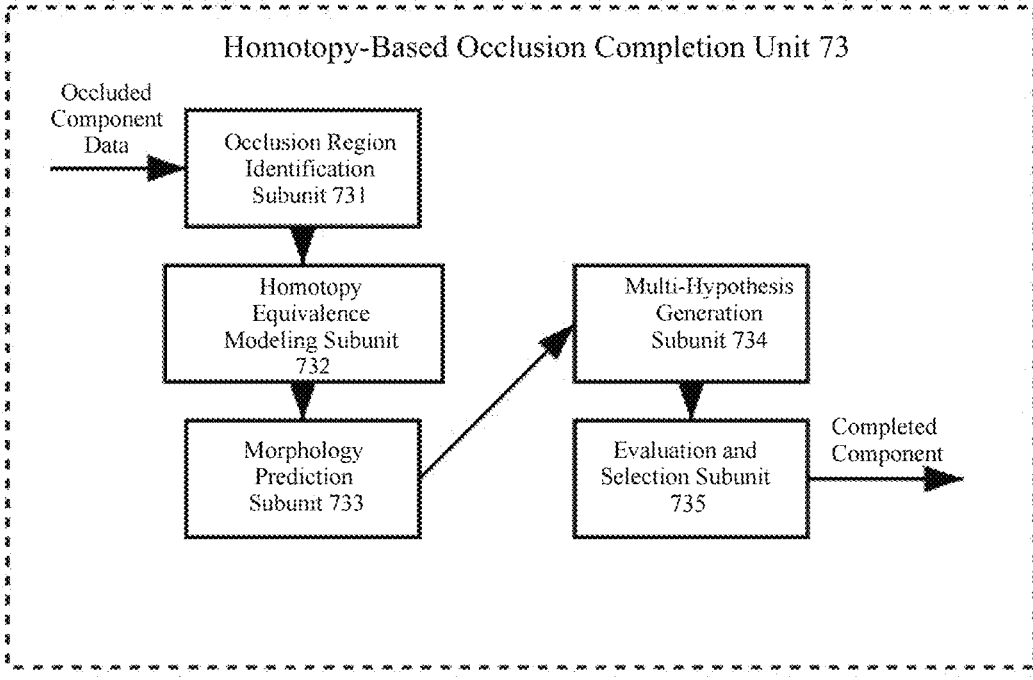
FIG. 9 is a flowchart of the homology group-based occlusion completion unit according to the invention.

Referring to FIG. 9, the homotopy group-based occlusion completion unit 73 consists of an occlusion region identification subunit 731, a homotopy equivalence relation modeling subunit 732, a morphological prediction subunit 733, a multi-hypothesis generation subunit 734, and an evaluation and selection subunit 735.

Occlusion Region Recognition Subunit 731 identifies occluded regions in the point cloud and analyzes their boundary topological features. Homotopy Equivalence Relation Modeling Subunit 732 establishes a mapping of topological spaces before and after occlusion. Morphological Prediction Subunit 733 matches similar prototypes from the component prototype library based on boundary topological features and performs topology-preserving deformation. Multi-Hypothesis Generation Subunit 734 generates multiple completion hypotheses.

Evaluation and Selection Submodule 735 selects the hypothesis with the highest topological score as the final completion result.

This submodule applies homotopy group theory to handle occlusion problems in architectural point clouds, thereby achieving topology-preserving component completion.

The specific implementation process is as follows:

First, identify the occluded regions in the point cloud using a point cloud density analysis method:

$$D_r = \frac{\rho_r}{\rho_a},$$

Among them: Dr represents the relative density value; $\rho_r$ is the point cloud density of region r, measured in points per cubic meter; $\rho_a$ is the average point cloud density of the surrounding regions, also measured in points per cubic meter. When Dr is less than the threshold (typically set to 0.3, i.e., 30% of the average density of the surrounding regions), the area is determined to be an occluded region.

After identifying the boundary point set of the occluded region, its topological features are analyzed, and the Euler characteristic x is computed:

$$x = V - E + F,$$

Where: x is the Euler characteristic, representing a fundamental topological invariant of the space; V is the number of vertices in the boundary graph; E is the number of edges in the boundary graph; F is the number of faces in the boundary graph. The Euler characteristic can be used to infer the basic topological type of the occluded region.

Next, establish a topological mapping between the occluded and pre-occlusion spaces. Define the complete component space X and the observed space after occlusion Y, and construct a topology-preserving mapping f from Y to X, ensuring that f preserves key topological invariants. Formally, this can be expressed as:

$$f : Y \to X \text{ such that } \pi_1(f(Y)) \cong \pi_1(Y),$$

Where: F denotes the mapping function from the occluded space Y to the complete space X; $\pi_1$ represents the fundamental group, reflecting the connectivity and loop structures of the space; $\cong$ denotes an isomorphism, indicating equivalence at the topological structure level. This constraint ensures that the completion process preserves the original topological features.

Next, based on the boundary topological features, similar prototypes are matched from the component prototype library, and the topological similarity ST and shape similarity SS are calculated:

$$ST = \frac{|BT_1 \cap BT_2|}{|BT_1 \cup BT_2|},$$

$$SS = 1 - \frac{d_H(S_1, S_2)}{d_{max}},$$

Where: ST is the topological similarity, ranging from [0, 1]; $BT_1$ and $BT_2$ are the sets of boundary topological descriptors for the two components; $|\cdot|$ denotes the cardinality of a set; $\cap$ denotes the intersection of sets; $\cup$ denotes the union of sets; SS is the shape similarity, ranging from [0, 1]; $d_H$ is the Hausdorff distance, measuring the maximum of the minimum distances between two point sets; $S_1$ and $S_2$ are the shape representations of the two components; $d_{max}$ is a normalization factor, typically taken as the maximum dimension of the component.

The overall similarity is calculated as:

$$S = w_T \times ST + w_S \times SS,$$

Where: S is the overall similarity, ranging from [0, 1]; $w_T$ and $w_S$ are the weights of the topological similarity and shape similarity, respectively, typically set as $w_T=0.6$, $w_S=0.4$ to emphasize the importance of topological features.

Perform topology-preserving deformation on the matched prototype, with a maximum deformation of 20% of the original size, ensuring topological invariance.

To improve completion accuracy, generate multiple completion hypotheses and design a topological scoring function:

$$Score = w_B \times B + w_S \times S + w_T \times T + w_K \times K,$$

Where: Score is the overall score of a completion hypothesis, ranging from [0, 1]; B represents boundary conformity, measuring how well the completed result matches the observed boundary; S denotes structural rationality, evaluating compliance with building structural rules; T indicates topological consistency, assessing whether the topological relationships with surrounding components are coherent; K represents domain knowledge constraints, measuring conformity to architectural principles. WB, $w_S$, $w_T$, and $w_K$ are the weights for each metric, typically set as $w_B=0.3$, $w_S=0.25$, $w_T=0.3$, $w_K=0.15$.

Finally, the hypothesis with the highest topological score is selected as the final completion result. Additional refinement is applied, including edge smoothing, texture and material completion, and enhancement of geometric details.

This homology-based occlusion completion algorithm can accurately restore occluded components while preserving topological consistency, effectively addressing complex occlusion scenarios that are difficult for conventional methods to handle.

Figure 10:
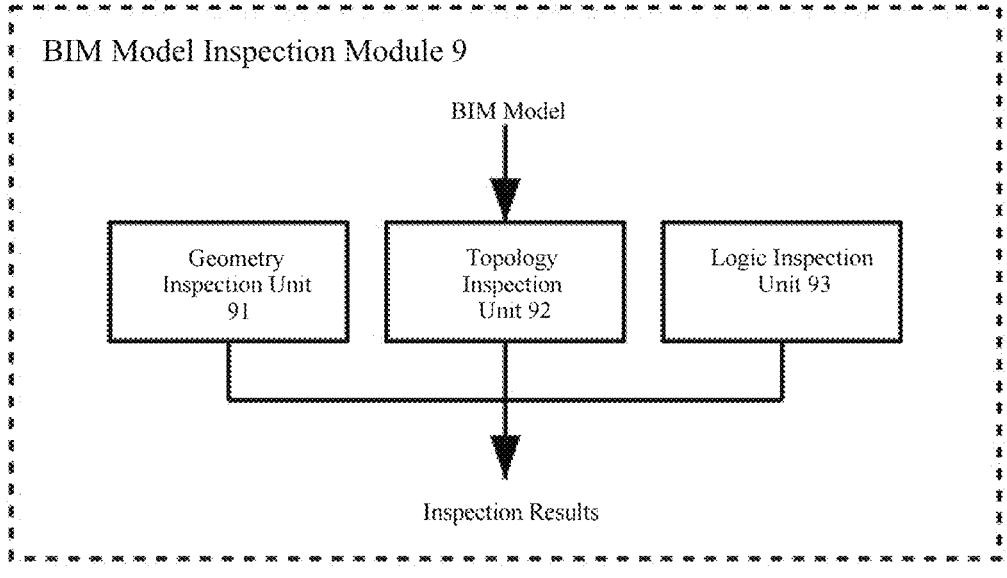
FIG. 10 is a schematic diagram of the BIM model checking module according to the invention.

Referring to FIG. 10, the BIM model inspection module 9 includes a geometry inspection unit 91, a topology inspection unit 92, and a logic inspection unit 93.

The geometry inspection unit 91 checks geometric features of building components, such as boundary line continuity, sharp angles, concave-convex surfaces, and intersections. The boundary line continuity threshold is set to 0.5 mm, and the angle threshold is set to 3° to ensure that the geometric shapes comply with the specifications.

The topology inspection unit 92 detects topological relationships of building components, including component overlaps, ownership, and connectivity. Component overlap detection uses a collision detection algorithm, with a maximum allowable overlap tolerance of 2 mm.

The logic inspection unit 93 verifies logical relationships such as consistency of component dimensions and uniformity of materials. Consistency checks for component dimensions are typically set with a tolerance of ±5 mm, while material uniformity is assessed using texture gradient analysis, allowing a maximum gradient variation of 20%.

Figure 11:
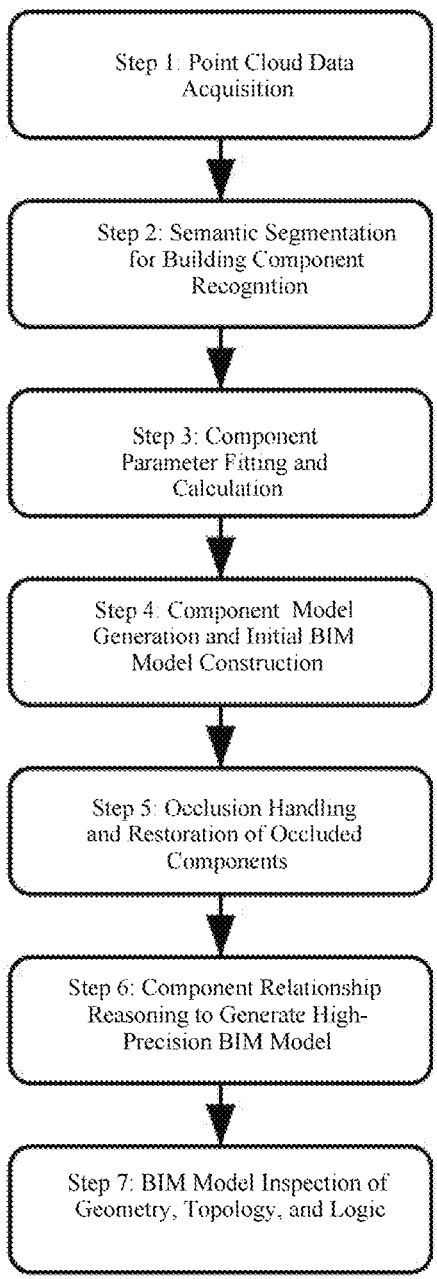
FIG. 11 is a flowchart of the intelligent processing method for building three-dimensional point cloud data and automatic generation of BIM models according to the invention.

Referring to FIG. 11, the present invention also provides a method for intelligent processing of 3D building point cloud data and automatic generation of BIM models, comprising the following steps:

Step 1: Acquire full-scale building point cloud data using a 3D laser scanning device. Preferably, a 3D laser scanner with an accuracy of ±2 mm is used, with a scanning resolution set to 10 mm@10 m, to capture sufficiently detailed architectural features.

Step 2: Process the acquired point cloud data by filtering, denoising, and sampling, and automatically identify building components using a deep neural network model, restoring partially occluded or damaged component shapes. This step is implemented through the semantic segmentation module 2, where the deep network adopts an improved PointNet architecture. During training, the cross-entropy loss function is used with an added weight decay regularization term, with a weight decay coefficient set to 0.0001 to prevent overfitting.

Step 3: Perform clustering, fitting, and statistical analysis on the identified building components to fit component boundary lines from the point cloud data and calculate parameters such as component width, height, material, and texture. This step is implemented through the component parameter fitting module 3. For complex curved components, NURBS surface fitting is used, with the control point grid resolution set to 10×10 and a fitting accuracy threshold of 1 mm.

Step 4: Based on the obtained component parameters, automatically select matching component models from the parameterized component model library 4 and automatically assemble them to generate a preliminary BIM model. This step is implemented through the component model generation module 5. During model assembly, the alignment between components is considered, with an alignment tolerance set to 3 mm to ensure proper connections between components.

Step 5: Automatically repair the occluded building components in the preliminary BIM model. This step is implemented via the occlusion handling module 6. During the repair process, the spatial relationships between components are maintained, and the occlusion determination threshold is set at 25% of the point cloud density.

Step 6: Process the repaired BIM model through the component relationship reasoning module 7. This involves constructing multi-scale topological feature representations of building components using persistent homology theory, building a topology-aware graph based on these features to perform component relationship reasoning, and applying homotopy group theory to achieve topologically consistent completion of occluded components. The module infers the topological and logical relationships among building components, automatically completing any missing components and generating a high-precision BIM model. This step represents the core innovation of the invention and corresponds to the three subunits of the component relationship reasoning module 7 described above.

Step 7: Perform geometric, topological, and logical checks on the generated BIM model, including verifying the continuity of component edges, detecting component overlaps, checking component ownership and connectivity, and ensuring consistency of component dimensions. This step is implemented via the BIM model inspection module 9 to guarantee that the final BIM model complies with building code requirements.

The advantage of the system and method of the present invention lies in the organic integration of topological theory with building point cloud processing and BIM model generation technologies. In particular, the component relationship reasoning module introduces persistent homology, topological persistence, and homotopy group theory, enabling precise inference of building component relationships and accurate completion of occluded components, thereby significantly improving the accuracy and completeness of BIM model generation. Compared with existing technologies, the invention demonstrates substantial improvements in component recognition robustness, relationship reasoning accuracy, and occlusion handling capability, and can adapt to various architectural styles and structural features, providing an efficient and reliable technical solution for automatic BIM generation.

The foregoing description illustrates preferred embodiments of the present invention and is not intended to limit the invention. For those skilled in the art, various modifications and variations of the invention are possible. Any changes, equivalent substitutions, or improvements made within the spirit and principles of the present invention shall fall within the protection scope of the invention.

What is claimed is:

1. An intelligent processing system for building three-dimensional point cloud data and automatic generation of BIM models, comprising a three-dimensional laser scanning device, configured to execute the following program modules:

a point cloud data acquisition module, configured to collect three-dimensional laser scanning point cloud data of buildings;

a semantic segmentation module, connected to the point cloud data acquisition module, configured to receive the three-dimensional laser scanning point cloud data collected by the point cloud data acquisition module and to identify building components by means of deep learning, spatial information, and geometric constraints;

a component parameter fitting module, connected to the semantic segmentation module, configured to receive the building components identified by the semantic segmentation module and to obtain component parameters through clustering, fitting, and statistical analysis;

a parametric component model library, configured to store parametric BIM component models that comply with engineering design standards;

a component model generation module, connected to the component parameter fitting module and the parametric component model library, configured to automatically select matching component models from the parametric component model library based on the component parameters obtained by the component parameter fitting module, and to automatically assemble them to generate a preliminary BIM model;

an occlusion processing module, connected to the component model generation module, configured to receive the preliminary BIM model generated by the component model generation module and to automatically repair building components that are occluded in the preliminary BIM model;

component relationship inference module, connected to the occlusion processing module, configured to receive the BIM model repaired by the occlusion processing module, the component relationship inference module comprising a multi-scale topological feature extraction unit, a topology persistence-driven relationship inference unit, and a homology group-based occlusion completion unit; wherein the multi-scale topological feature extraction unit is configured to construct multi-scale topological feature representations of building components through persistent homology theory, the topology persistence-driven relationship inference unit is configured to perform component relationship inference by constructing a topology-aware graph structure based on topological features, and the homology group-based occlusion completion unit is configured to achieve topology-preserving completion of occluded components through homology group theory, thereby inferring the topological and logical relationships among building components, automatically completing missing components, and generating a high-precision BIM model;

BIM model construction module, connected to the component relationship inference module, configured to receive the high-precision BIM model generated by the component relationship inference module and to perform model integration; and BIM model inspection module, connected to the BIM model construction module, configured to perform geometric, topological, and logical checks on the BIM model integrated by the BIM model construction module.

2. The intelligent processing system for building three-dimensional point cloud data and automatic generation of BIM models according to claim 1, wherein the semantic segmentation module comprises:

a data processing unit, configured to perform filtering, denoising, and sampling operations on point cloud data;

a building feature recognition unit, configured to automatically identify building components using a deep neural network model;

a semantic reconstruction unit, configured to restore locally occluded or damaged component shapes; and a data output unit, configured to transmit the identified semantic data to the component parameter fitting module.

3. The intelligent processing system for building three-dimensional point cloud data and automatic generation of BIM models according to claim 1, wherein the component parameter fitting module comprises:

a data processing unit, configured to convert the received point cloud data into digital sequences and segment them according to clustering density;

a clustering unit, configured to divide the point cloud data into subsets corresponding to each building component;

a fitting unit, configured to perform fitting on the point cloud data within each subset to generate component boundary lines; and a statistical analysis unit, configured to calculate parameters of each component, including width, height, material, and texture, based on the fitted boundary lines.

4. The intelligent processing system for building three-dimensional point cloud data and automatic generation of BIM models according to claim 1, wherein the component model generation module comprises:

a component parameter receiving unit, configured to receive the component parameters obtained by the component parameter fitting module;

a component matching unit, configured to match corresponding models from the parametric component model library; and a model automatic construction unit, configured to generate a preliminary BIM model based on the models matched by the component matching unit.

5. The intelligent processing system for building three-dimensional point cloud data and automatic generation of BIM models according to claim 1, wherein the parametric component model library comprises:

a component model unit, configured to create a parametric definition for each component model; and a matching model library unit, configured to extract models from the component model unit and construct a mapping between the models and the corresponding component parameters.

6. The intelligent processing system for building three-dimensional point cloud data and automatic generation of BIM models according to claim 1, wherein the multi-scale topological feature extraction unit comprises:

a preprocessing subunit, configured to receive the component point cloud data after semantic segmentation and perform coordinate normalization;

a complex construction subunit, configured to construct a nested sequence of Vietoris-Rips complexes;

a homology calculation subunit, configured to compute homology groups of different dimensions;

a persistence pair extraction subunit, configured to record the birth and death values of topological features to form persistence pairs; and a feature descriptor generation subunit, configured to generate topological feature descriptors of the components.

7. The intelligent processing system for building three-dimensional point cloud data and automatic generation of BIM models according to claim 1, wherein the topology persistence-driven relationship inference unit comprises:

a topology-aware graph construction subunit, configured to treat components as nodes in a graph and establish connections based on spatial proximity and topological similarity;

a topology attention computation subunit, configured to calculate topological similarity and attention weights between components;

a message passing subunit, configured to perform multi-level message passing, from local connectivity to global topological structure analysis;

a relationship prediction subunit, configured to predict the types of relationships between components and their confidence levels; and a topology consistency verification subunit, configured to apply topological rules to verify and correct the predicted relationships.

8. The intelligent processing system for building three-dimensional point cloud data and automatic generation of BIM models according to claim 1, wherein the homology group-based occlusion completion unit comprises:

an occlusion area identification subunit, configured to identify occluded areas in the point cloud and analyze their boundary topological features;

a homotopy equivalence modeling subunit, configured to establish a topological space mapping before and after occlusion;

a morphology prediction subunit, configured to match similar prototypes from the component prototype library based on boundary topological features and perform topology-preserving deformation;

a multiple-hypothesis generation subunit, configured to generate multiple completion hypotheses; and an evaluation and selection subunit, configured to select the hypothesis with the highest topological score as the final completion result.

9. The intelligent processing system for building three-dimensional point cloud data and automatic generation of BIM models according to claim 1, wherein the BIM model inspection module comprises:

a geometric inspection subunit, configured to check the continuity of building component boundary lines, sharp corners, concave-convex surfaces, and intersections;

a topological inspection subunit, configured to detect component overlaps, component ownership, and connectivity; and a logical inspection subunit, configured to verify the consistency of component dimensions and the smooth consistency of materials.

10. A method for intelligent processing of 3D building point cloud data and automatic generation of a BIM model, using the system for intelligent processing of 3D building point cloud data and automatic BIM model generation as claimed in claim 1, comprising:

acquiring full-scale point cloud data of a building using a three-dimensional laser scanning device;

processing the acquired point cloud data by filtering, denoising, and sampling, automatically identifying building components using a deep neural network model, and restoring locally occluded or damaged component shapes;

performing clustering, fitting, and statistical analysis on the identified building components to fit component boundary lines from the point cloud data and calculate component parameters, including width, height, material, and texture;

automatically selecting matching component models from the parametric component model library based on the obtained component parameters and automatically assembling them to generate a preliminary BIM model;

automatically repairing occluded building components in the preliminary BIM model;

processing the repaired BIM model through the component relationship inference module, comprising:

constructing multi-scale topological feature representations of building components using persistent homology theory, by constructing nested complex sequences, computing homology groups, extracting persistence pairs, and generating feature descriptors, thereby representing the topological features of the components;

constructing a topology-aware graph structure based on topological features and performing component relationship inference using a topology attention mechanism and multi-level message passing;

implementing topology-preserving completion of occluded components using homology group theory, by identifying occluded areas, establishing homotopy equivalence relationships, predicting component morphology, and evaluating multiple completion hypotheses to select the optimal completion result;

inferring the topological and logical relationships among building components, automatically completing missing components, and generating a high-precision BIM model; and performing geometric, topological, and logical checks on the generated BIM model, including checking the continuity of building component boundary lines, detecting component overlaps, verifying component ownership and connectivity, and ensuring the consistency of component dimensions.

\* \* \* \* \*